United States Patent [19]
Samuelsson

[11] Patent Number: 6,043,875
[45] Date of Patent: Mar. 28, 2000

[54] METHOD AND DEVICE FOR THE MEASURING OF WHEEL ANGLES

[76] Inventor: Jonas Samuelsson, S 70220 Örebro, Örebro, Sweden

[21] Appl. No.: 09/082,371

[22] Filed: May 20, 1998

[30] Foreign Application Priority Data

May 22, 1997 [SE] Sweden .................................. 9701927

[51] Int. Cl.[7] .............................. G01B 11/26; G01C 1/06
[52] U.S. Cl. ...................... 356/139.09; 356/155; 356/139
[58] Field of Search ................................ 356/39.09, 155, 356/139.09, 138

[56] References Cited

U.S. PATENT DOCUMENTS

| | | | |
|---|---|---|---|
| D. 263,019 | 2/1982 | Samuelsson | D8/70 |
| 3,777,537 | 12/1973 | Samuelsson et al. | 72/404 |
| 4,159,574 | 7/1979 | Samuelsson et al. | 33/228 |
| 5,440,392 | 8/1995 | Pettersen et al. | 356/375 |
| 5,453,839 | 9/1995 | Samuelsson | 356/375 |
| 5,535,522 | 7/1996 | Jackson | 356/155 |
| 5,648,846 | 7/1997 | Douine et al. | 356/139.09 |
| 5,675,408 | 10/1997 | Samuelsson et al. | 356/155 |
| 5,675,515 | 10/1997 | January | 356/39.09 |
| 5,724,128 | 3/1998 | January | 356/155 |
| 5,731,870 | 3/1998 | Bartko et al. | 356/130.09 |

FOREIGN PATENT DOCUMENTS

| | | | |
|---|---|---|---|
| 0647829 | 4/1995 | European Pat. Off. | G01B 21/26 |
| 8403456 | 2/1986 | Sweden | G01B 11/275 |
| 9714016 | 4/1997 | WIPO | G01B 11/275 |

*Primary Examiner*—Frank G. Font
*Assistant Examiner*—Roy Punnose
*Attorney, Agent, or Firm*—Hayes, Soloway, Hennessey, Grossman & Hage PC

[57] ABSTRACT

Measuring system for the measuring of wheel angles comprising cameras (21) pivotable on rear wheel (22) fastenings and looking both on front wheel marker arrangements (24) and a marker device (25) arranged perpendicular relative the length direction of the vehicle. The camera registers the angles of the wheel it is mounted on by viewing the marker device and the angles of the front wheel by subtracting the angles of the wheel with the camera from those obtained for the marker arrangement on the front wheel. The marker arrangement is diametrically symmetric and allows together with pivotability of the camera a rotating of the wheels over a half revolution so that possible mounting errors can be detected and correlated for.

17 Claims, 4 Drawing Sheets

METHOD AND DEVICE FOR THE MEASURING OF WHEEL ANGLES

BACKGROUND OF THE INVENTION

This invention is concerned with a method and a device for the measuring of wheel angles of vehicles. Comparatively many such methods and devices are known, which in a varying degree require careful placing of the vehicle and in general very careful adjustment of measuring sensors on wheels etc. These devices are not only demanding as to the mounting itself but are frequently also comparatively expensive and may also be difficult to handle. The devices are also rather easily damaged.

In view of the above there exists a need for a method and a device for the measuring of wheel angles of vehicles that is easier to handle, more easily mounted on a vehicle, accurate and preferably less expensive than these devices on the market today.

SUMMARY OF THE INVENTION

In accordance with the invention these objects are achieved by the use of an electronic camera, which is hardly what one expects as a means to obtain robustness. The camera that is the base in the invented system is preferably provided with a bearing essentially perpendicular to its optical axis allowing it to be pivotally mounted on for instance a wheel bracket with a stubshaft generally intended to coincide with the axle of the wheel. The camera can actually be extremely robust with very few parts that need not to be moveable and that hence can be permanently and sturdily fixed in their positions. Even the lens may be fixed due to the great light sensitivity of the camera. In fact the camera can survive and continue to function even if it is dropped on the ground. In particular the camera may be a special measuring camera that only sees particular markers and measure directions.

Preferably the camera is constructed and arranged so that its viewing direction independent of the rotating of the wheel remain essentially the same, in particular a horizontal direction. This effect can be achieved by means of gravity or a resilient connection to the vehicle, for instance a rubber string attached to a preferably higher point on the vehicle (This will also serve as an insurance against any damages to the camera if it should become free from the wheel).

Furthermore the invention includes marker arrangements that are easily detectable by the camera, for instance using reflectors. These marker arrangements comprise a symmetrical set of markers on each side of the vehicle that are detectable by with at least three markers on each side of the vehicle that are detected by the camera the three markers on each side being placed so that at least two markers have different positions relative to the length axis of the vehicle and at least two markers have different positions perpendicular to the length axis of the vehicle. The configuration of the marker arrangement (geometry and dimensions) is known to the camera.

Also, marker devices can be used in the system. Such a marker device extends across the vehicle perpendicular to the length axis of the vehicle and being provided so each side of the vehicle with at least three markers that are detectable by the camera, the three markers on each side being placed so that at least two markers have different positions relative to the length axis of the vehicle and at least two markers have different positions perpendicular to the length axis of the vehicle. The marker configuration is registered in the camera enabling the marker device to serve as a base for parallelism when measuring angles so that the measurements of the left and right side can be correlated. To place the marker device lengthwise to the vehicle, it may have built in places.

For instance the marker devices may comprise reflectors arranged at the ends of the marker device on each side with the reflectors facing the camera. In this way the camera can establish parallel planes on each side of the vehicle to serve as a base for the wheel angle measuring.

Yet another part of the invented system is the reference axle. This is an axle that can be rotated in a mounting at least half a revolution and carries at its outer ends symmetrically arranged markers so that a marker device is obtained. By measuring and rotating over a half revolution faults in the device can be detected and compensated. The reference axle can alternatively at its outer ends have stubshafts for the mounting of pivotable cameras. In this way the camera or cameras can be mounted on an end of the vehicle or on some support. By turning the axle half a revolution parallel planes can be established on each side even if the device due to careless handling has become distorted.

The most common error of all is skew wheels. In order to eliminate the influence of this cameras and/marker arrangements devices may be mounted on adjustable fastening means and adjusted to parallel before measuring. Another far better way of eliminating the influence of misalignments caused by skew wheels on which cameras and/or marker arrangements or devices are mounted to rotate the wheels a half revolution between measuring. The correct value is the mean value of the two measurings. The vehicle wheels may be turned by rolling the wheels on the ground. If one wants to check the cameras these may be removed and turned upside down and mounted on their pivot axle with the ends of its bearing changing places. If the registered angles are the same the camera axis is still exactly perpendicular to the pivot axis. If not a corresponding correction can be calculated.

In other words the invention is capable of checking and compensating for errors in the mounting of the cameras and/or the marker arrangements or devices which makes complicated adjustment devices unnecessary and allows for automatic compensation of errors due to skew wheels or mishandling. When the camera is mounted on a wheel, its position relative to the vehicle will be very well defined and mounting errors, as such, quickly and precisely adjusted.

A surprisingly great number of different ways of measuring wheel angles can easily be obtained with the above components, as will be shown below by way of examples.

Preferably two cameras are used, one on each wheel of a pair of wheels on a common axle (including also wheels mounted on separate axles but symmetrically in relation to the vehicle). With two cameras it is possible to measure the angles between the wheels more easily, for instance toe and camber.

By using reflectors of different sizes and/or shapes as markers for the different locations in marker arrangements and/or devices, the camera can identify the different reflectors and also run a rough check of calculated differences, since it knows at each distance how large the reflector image would be.

Further advantages and characteristics of the invention as well as further developments will below become apparent from a description of preferred embodiments with reference to the accompanying drawings.

BRIEF DESCRIPTION OF THE DRAWINGS

In FIG. 1 is shown how a camera 1 is fastened to a wheel 2 on the third axle of a lorry. The camera 1 is fastened by means of a bracket 4 and journaled pivotable relative to the bracket on a stub shaft 3 essentially concentric with the axle. The center of gravity is however eccentric and situated slightly behind a radius from the pivot axle that is essentially perpendicular to the viewing direction. In this manner the camera will automatically swing to the correct viewing position looking forward and slightly upward so that marker arrangements 5 on the second wheel axle and the front axle wheels can be seen at the same time without interfering with each other.

The camera is of the ccd type with 400×600 pixel (ProReflex from Qualisys AB Sweden) and is connected to a computer of the pc-type. The camera is further provided with an infrared light source.

Figure 4:
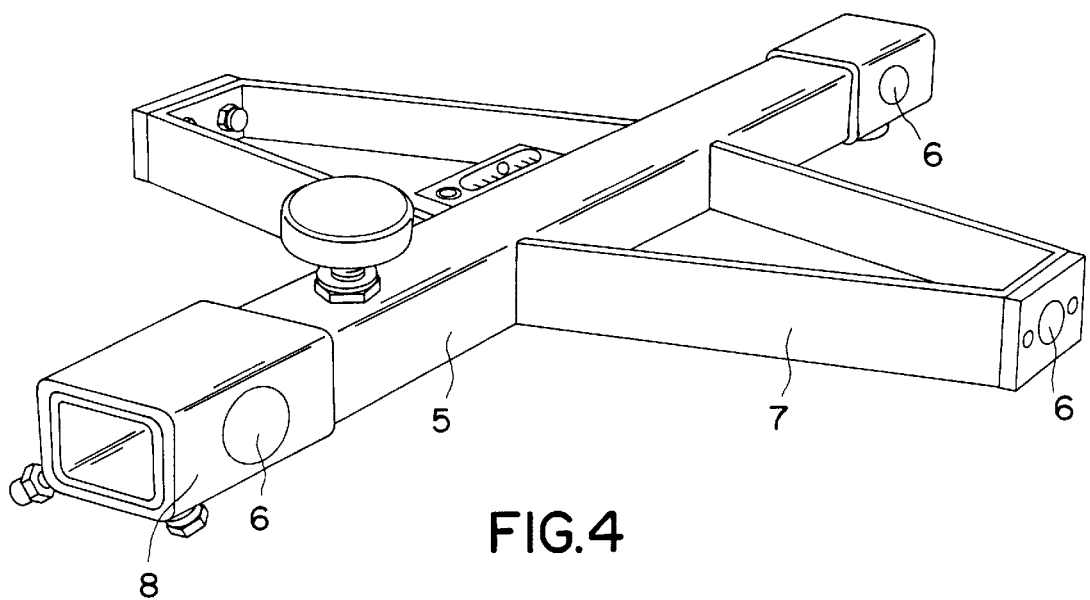
FIG. 4 shows a maker device with markers arranged according to the invention with leveling apparatus.

The wheel marker arrangements 5 each constitutes a cross with six markers 6, one pair in each axial end and one on each of the radially arranged arms as can be seen in FIG. 4. The wheel marker arrangements 5 on the wheels has thus the shape of a cross with one end 8 of a bar fastened to a fastening bracket 9 and 10 respectively essentially as an extension of the wheel axle.

On the vehicle frame transverse bars 11 of identical length are arranged in the front and rear and at their ends provided with marker arrangements 5.

All the markers are circular allowing for integration over the borderlines giving an extremely great precision. The markers have glass bead surfaces and thus reflects the infrared light from the camera back to this. The camera together with its software result in a precision laterally of fractions of millimeters and lengthwise of a few millimeters under the depicted conditions. This means that the camera 1 can register the coordinates for each marker with great accuracy, in turn meaning that the location of the markers relative the camera can be calculated as well as all the angles of the marker arrangements and thereby the wheel angles.

With the marker arrangements 5 and cameras 1 mounted as described above on each side of the lorry each camera is swung back so that it can register the lateral position of the crossbar 11 marker arrangements. The cameras are then allowed to swing back and register the position of the front cross bar marker arrangements giving the camera a reference relative to the lorry that is parallel to the length axis of this. At the same time the angles of the rear wheel is obtained including a check if the rear axle is perpendicular to the length axis of the lorry. A deviation in this angle (thrust) give in particular rise to increased air resistance by the vehicle going obliquely through the air.

When the camera 1 looks on the marker arrangement shown in FIG. 4 the camber angle will manifest itself as the lateral inclination between the two axial markers.

The toe-in corresponds to the detected lateral deviations for the radial markers from their actual lengthwise positions between the two axial markers. If for instance the radial marker in view seem to have moved slightly closer to the outer axial marker a toe-in exist.

By furthermore turning (steering) the front wheels a certain angle (prescribed by the manufacturer) it is possible to check caster and king pin angles to see if these are as prescribed. Actually the invention allows a continuous monitoring of the wheel angles during steering so that also the other angles can be controlled with even greater precision than what is possible with the devices available today.

Figure 3A:
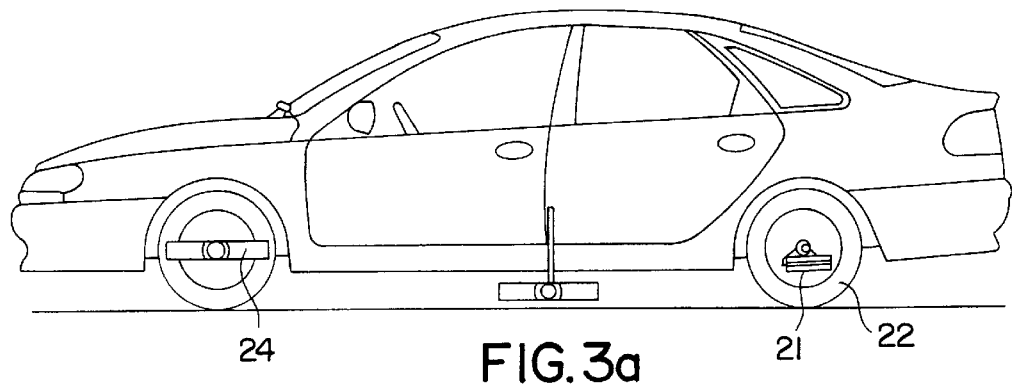
FIG. 3a shows a side view of a passenger vehicle in connection with another embodiment of the invention.
Figure 3B:
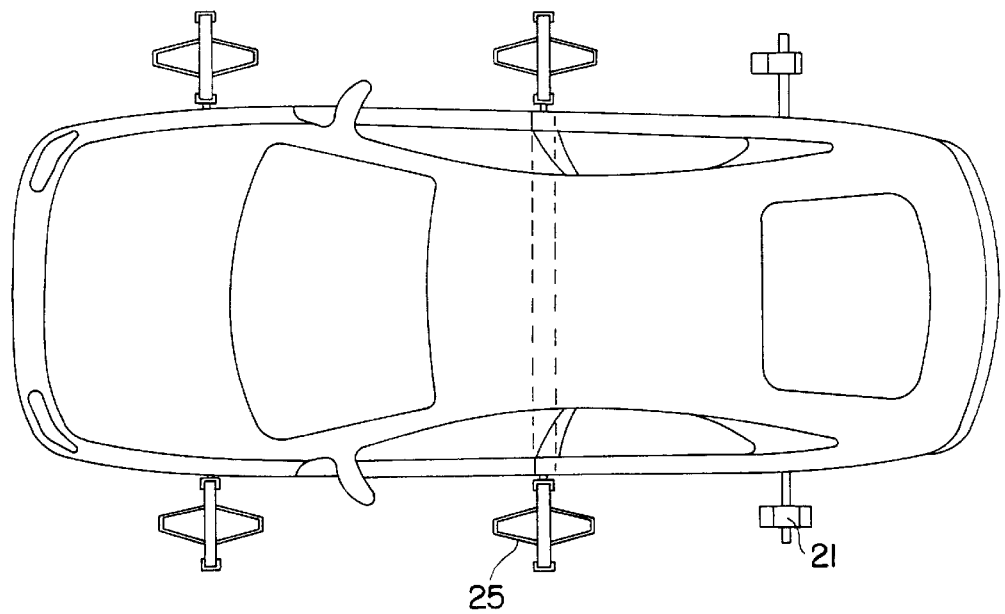
FIG. 3b is a top view of a passenger vehicle showing camera and market arrangements for measuring wheel angles.

FIG. 3 shows the invention as used for a small passenger car. The camera 21 on the rear wheel 22 and the front wheel marker arrangements 24 function just as in the lorry case but with one axle less. Parallelism and the angles for the rear wheels are obtained when the camera registers the marker device positions for a reference crossbar that at its ends is provided with wheel marker arrangements.

In the two above described examples two cameras are used, one for each side, however it is possible to carry out the measuring with only one camera together with for instance adjustable wheel mountings of the type that is used with older devices for wheel angle measuring or by successively monitoring diametrical position.

Using the older method, at first each wheel is rotated and adjustment mechanically carried out to achieve concentric marker arrangements. The new method is characterized in that the camera can register this misalignment for diametrical readings and later use these for correction. Surprisingly this can also be achieved for the toe-in, however the front wheels may not move during the transfer of the camera from one side to the other.

The marker reflections registered by the camera are actually direction coordinates for the reflected light beams, but since the computer has stored the true marker arrangement dimensions distance and angles can be calculated. With the camera set (infrared filter) for registering the infrared reflections only the markers are seen by the camera and no filtering step is necessary to clean the recorded image. Instead of using reflectors LED:s can be used which allows for coded light emission facilitating for the computer to distinguish different markers.

Figure 1:
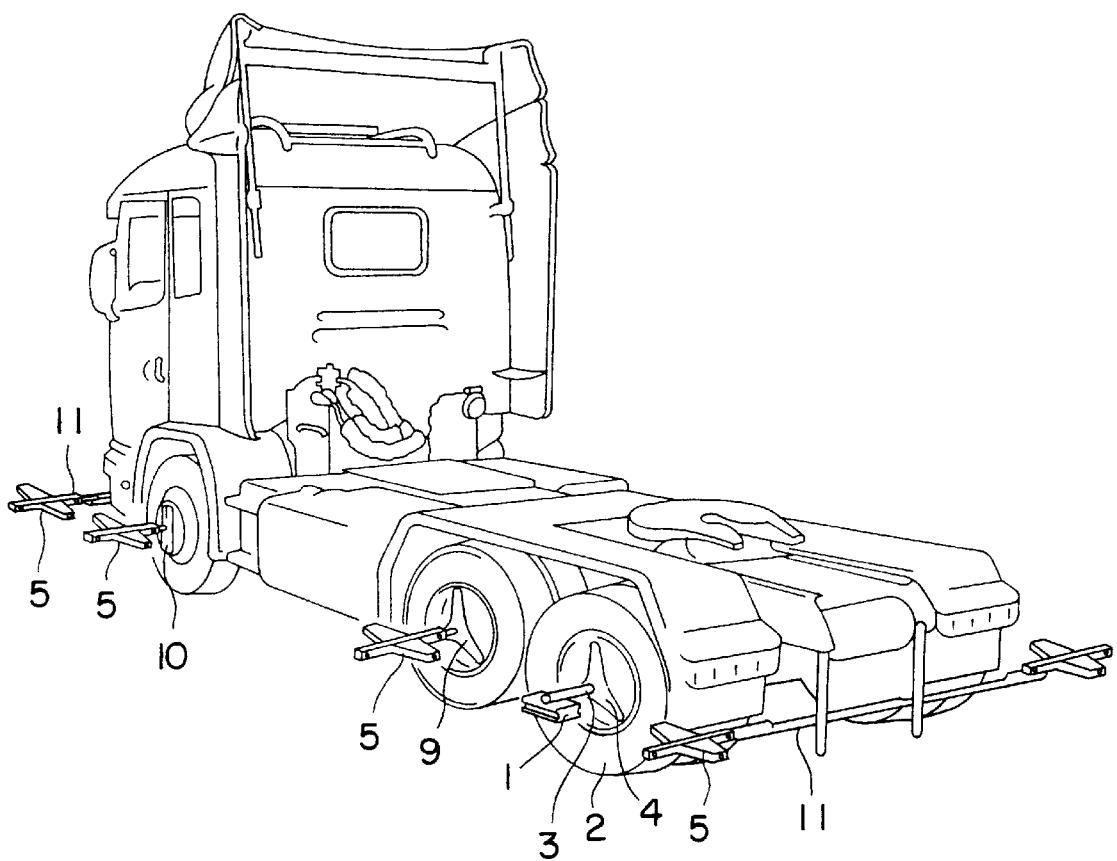
FIG. 1 is a perspective view of a lorry employing a first embodiment of the invention for the measuring of wheel angles.
Figure 2:
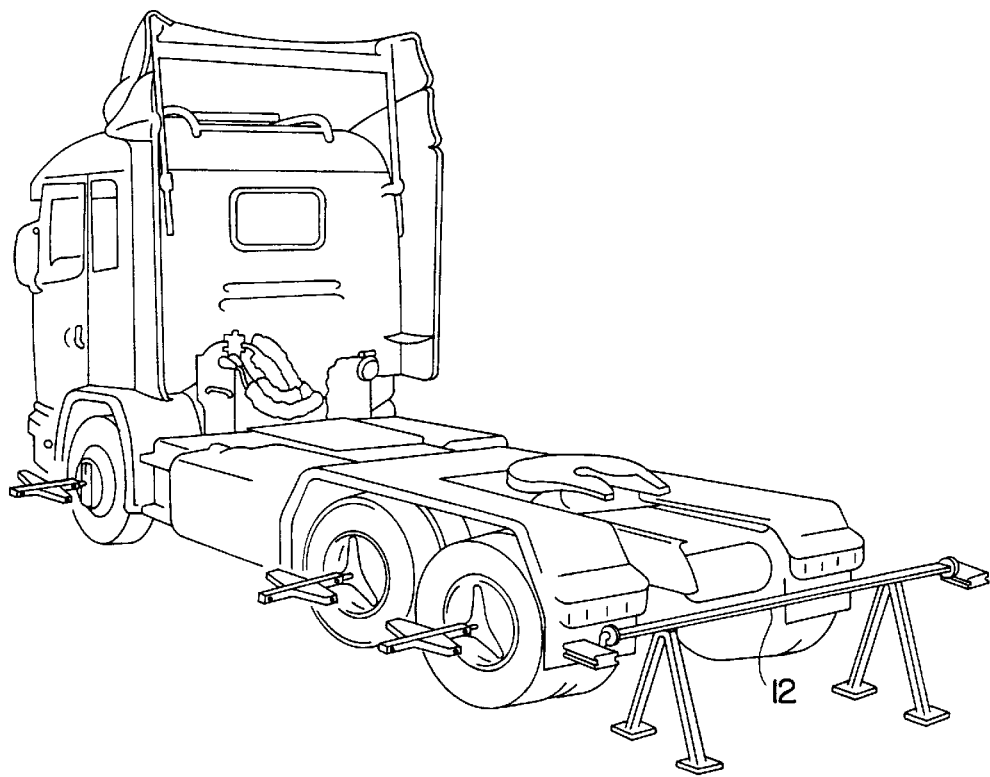
FIG. 2 shows in the same way as FIG. 1 a perspective view of a lorry, but in connection with the second embodiment of the invention.

In FIG. 2 a further embodiment of the invention is shown. A special reference axle 17 is provided for the mounting of a camera 1 or a pair of cameras at the ends. The reference axle is provided with stub axles of the same kind as the wheel mountings for the cameras and the camera is thus pivotable on these stub axles in the same way as on the wheel brackets and measuring can be carried out in the same way as described above. The stub axles 18 are actually ends of a common axle that is journaled for rotation in a fastening bracket for universal mounting to the rear or front of a car, bus or lorry or to a wall or a support of some kind. This reference axle is journaled for rotation but is provided with end stops permitting only a half revolution. In this way it is possible to check and correct (in the computer) for misalignment between the stubshafts for the camera if the device has been handled to roughly. This in turn means that a fixture is obtained for the camera or cameras that can always and easily be checked and used not only for wheel angle measuring but also for body measuring. Since the device can so easily be checked and errors corrected a robust or heavy duty device is obtained that can be light and easy to handle.

I claim:

1. Marker device for the measuring of wheel angles on vehicles with an electronic camera, in particular toe in, camber and thrust misalignment between wheels and body, comprising:

a supporting structure provided with fastening means enabling mounting on a vehicle perpendicular to the length axis of the vehicle and at each end being provided with at least three markers that are detectable by the camera, the three markers at each end being placed so that at least two have different positions relative to the length axis of the vehicle and at least two have different positions perpendicular to the length axis of the vehicle, the positions of the markers are well defined as to dimensions and configuration so that the marker device can serve as a base for parallelism and camera angles at a measuring of the wheel angles so that the measurements of the left and right side can be correlated.

2. Marker device according to claim 1, wherein the marker device comprising at each end markers arranged at the ends of the arms of a cross with all markers facing in a direction parallel to the length axis of the vehicle in an essentially horizontal plane and with one arm of the cross parallel to the length axis of the vehicle and the other arm perpendicular to the length axis of the vehicle.

3. Marker device according to claim 1 wherein the marker device comprising at each end markers arranged on a reference axle that is mounted horizontal and perpendicular to the vehicle length axis, which axle in turn is rotatable, preferably over at least a half turn enabling a check of the marker device and correction for misalignment between the right and left side, simply by turning the axle, if correct the same angle will be recorded after a half revolution, if a difference is registered the registered angle values can be used for correction.

4. Marker device according to claim 1, and comprising a symmetrical double set of markers at the ends.

5. Marker device according to claim 1, wherein the marker ends being pivotable on axles essentially perpendicular to the length direction of the vehicle.

6. Marker arrangement for mounting on the wheels when measuring wheel angles on vehicles with an electronic camera, in particular toe in, camber and thrust misalignment between wheels and body, comprising: at least three markers that are detectable by the camera, the three markers being placed so that at least two have different positions relative to the length axis of the vehicle and at least two have different positions perpendicular to the length axis of the vehicle, the positions of the markers are well defined as to dimensions and configuration so that the wheel angles can be registered.

7. Marker arrangement according to claim 6, wherein said markers are symmetrically placed in relation to the wheel axle with individual markers located at the ends of the arms of the cross, said cross including two diagonal arms extending essentially concentric with the wheel axis, said cross including at the distal ends of these arms pairs of reflectors arranged facing in opposite directions.

8. Marker device according to claim 1, wherein the markers having different sizes or contours for identification purposes.

9. Marker device according to claim 1, wherein the markers have defined size to enable the camera to check if calculated distance registrations are correct.

10. Camera for the measuring of wheel angles on vehicles, in particular toe-in, camber and thrust misalignment between wheels and body, comprising a fastening means for fastening it on a vehicle wheel and that the camera is journaled on the fastening means pivotable on an axle that is essentially coinciding with the vehicle wheel and that the camera has its center of gravity and pivot axle so located that the camera automatically will hang looking forwards with the optical axis of the camera essentially perpendicular to the pivot axis.

11. Camera according to claim 10, wherein the pivot bearing being symmetric relative the optical axis of the camera so that symmetric readings are obtained if the same camera is shifted between the vehicle sides.

12. Camera according to claim 10, wherein the camera being pivotable mountable in front or in the rear of the vehicle at the ends of a reference axle that is essentially perpendicular to the length direction of the vehicle and horizontal, the reference axle being rotatable in a support or fastening bracket, preferably over a half revolution to enable a parallelism check and correlation of the camera angles.

13. Method for the measuring of wheel angles on vehicles, in particular toe in, camber and thrust misalignment between wheels and body, comprising the use of an electronic camera looking along the vehicle and bars provided with two markers at each end that are easy for the camera to detect, which bars are of the same length and arranged horizontally and laterally symmetrically at different locations lengthwise of the vehicle, marker bars serving as a base for parallelism at the measuring of the wheel angles so that the measurements of the left and right side can be correlated.

14. Method for the measuring of wheel angles on vehicles, in particular toe in, camber and thrust misalignment, comprising the steps of mounting an electronic camera on a wheel, the camera being pivotable on its mounting and the camera registering the angles of that wheel by viewing a marker device in accordance with claim 1.

15. Method according to claim 14, wherein the camera simultaneously registers the positions of a marker arrangement on another wheel, the angles of which are obtained by subtracting the angles of the wheel with the camera from those obtained for the marker arrangement.

16. Marker device according to claim 6, wherein the markers having different sizes or contours for identification purposes.

17. Marker device according to claim 6, wherein the markers have defined size to enable the camera to check if calculated distance registrations are correct.

* * * * *